US011272534B2

(12) United States Patent
Peisa et al.

(10) Patent No.: US 11,272,534 B2
(45) Date of Patent: Mar. 8, 2022

(54) CONTENTION-FREE RANDOM ACCESS WITH MULTIPLE SSB

(71) Applicant: Telefonaktiebolaget LM Ericsson (publ), Stockholm (SE)

(72) Inventors: Janne Peisa, Espoo (FI); Jan Christoffersson, Luleå (SE); Asbjörn Grövlen, Stockholm (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 16/646,653

(22) PCT Filed: Oct. 26, 2018

(86) PCT No.: PCT/IB2018/058395
§ 371 (c)(1),
(2) Date: Mar. 12, 2020

(87) PCT Pub. No.: WO2019/082152
PCT Pub. Date: May 2, 2019

(65) Prior Publication Data
US 2020/0275479 A1 Aug. 27, 2020

Related U.S. Application Data

(60) Provisional application No. 62/578,039, filed on Oct. 27, 2017.

(51) Int. Cl.
*H04W 74/00* (2009.01)
*H04W 74/04* (2009.01)
*H04W 74/08* (2009.01)

(52) U.S. Cl.
CPC ......... *H04W 74/008* (2013.01); *H04W 74/04* (2013.01); *H04W 74/0833* (2013.01); *H04W 74/0891* (2013.01)

(58) Field of Classification Search
CPC . H04W 74/006; H04W 74/008; H04W 74/04; H04W 74/0833; H04W 74/0891
See application file for complete search history.

(56) References Cited

U.S. PATENT DOCUMENTS

2019/0110314 A1* 4/2019 Abedini .............. H04W 74/008
2020/0275319 A1* 8/2020 Murray ............. H04W 36/0005
(Continued)

FOREIGN PATENT DOCUMENTS

WO 2017 155239 A2 9/2017

OTHER PUBLICATIONS

3GPP TSG RAN WG1 Meeting 90bis; Prague, CZ; Source: Samsung; Title: Remaining details on PRACH procedure (R1-1717582)—Oct. 9-13, 2017.
(Continued)

*Primary Examiner* — Kashif Siddiqui
(74) *Attorney, Agent, or Firm* — Sage Patent Group

(57) ABSTRACT

According to some embodiments, a method in a wireless device of performing random access comprises receiving a random access configuration. The random access configuration comprises one or more associations of a synchronization signal block (SSB), a preamble sequence, and physical random access channel (PRACH) configuration resources. The PRACH resources comprise time domain resources and frequency domain resources. The method further comprises receiving one or more SSBs; selecting one of the one or more received SSBs; and selecting a preamble sequence. The preamble sequence is associated with the selected SSB in the random access configuration. The method further comprises transmitting the selected preamble sequence on PRACH resources associated with the selected SSB in the random access configuration. In particular embodiments, more than one SSB is associated with iden-
(Continued)

tical PRACH resources, and the preamble sequence associated with each of the more than one SSBs identifies the SSB with respect to the PRACH resources.

20 Claims, 14 Drawing Sheets

(56) References Cited

U.S. PATENT DOCUMENTS

2020/0296765 A1* 9/2020 Kim .................. H04W 74/0833
2020/0305197 A1* 9/2020 Kim .................. H04W 72/0446

OTHER PUBLICATIONS

PCT International Search Report for International application No. PCT/IB2018/058395—dated Jan. 18, 2019.
PCT Written Opinion of the International Search Report for International application No. PCT/IB2018/058395—dated Jan. 18, 2019.

* cited by examiner

CONTENTION-FREE RANDOM ACCESS WITH MULTIPLE SSB

PRIORITY

This nonprovisional application is a U.S. National Stage Filing, under 35 USC. § 371 of International Patent Application Serial No, PCT/IB2018/058395 filed Oct. 26, 2018 and entitled "Contention-Free Random Access with Multiple SSB" which claims priority to U.S. Provisional Patent Application No. 62/578,039 filed Oct. 27, 2017 both of which are hereby incorporated by reference in their entirety.

TECHNICAL FIELD

Particular embodiments are directed to wireless communications and, more particularly, to contention-free random access procedures using a physical downlink control channel (PDCCH) order or a radio resource control (RRC) message.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The Third Generation Partnership Project (3GPP) long term evolution (LTE) includes two forms. In a first form, access is contention-based (with an inherent risk of collision). A second form is contention-free. In contention-based random access, a preamble sequence is randomly chosen by a user equipment (UE), which may result in more than one UE simultaneously transmitting the same signature and requiring a subsequent contention resolution process. For handovers, an eNodeB may prevent contention by allocating a dedicated signature to a UE (contention free).

The contention-based procedure consists of four primary steps: (1) preamble transmission; (2) access response; (3) transmission of message 3 (MSG.3); and (4) contention resolution message. An example is illustrated in FIG. 1.

FIG. 1 is a flow diagram illustrating an example contention-base random access procedure. In step 1, preamble transmission, a UE selects one of 64-Z physical random access channel (PRACH) contention-based sequences (where Z is a number allocation for contention-free preambles allocated by the eNodeB).

The set of contention-based signatures is further subdivided into two subgroups, so that the choice of preamble can carry one bit of information relating to the amount of transmission resource needed to transmit Message 3. The broadcast system information indicates which signatures are in each of the two subgroups (each subgroup corresponding to one value of the one bit of information), as well as the meaning of each subgroup.

The UE selects a sequence from the subgroup corresponding to the size of transmission resource needed for the appropriate random access channel (RACH) use case (some use cases require only a few bits to be transmitted in MSG.3, so choosing the small message size avoids allocating unnecessary uplink resources). When selecting an appropriate resource size, the UE accounts for the current downlink path-loss and the required transmission power for MSG.3 to avoid being granted resources for MSG.3 requiring a transmission power that exceeds the UE's capabilities. The transmission power required for MSG.3 message is calculated based on parameters broadcast by the eNodeB, which provides the network some flexibility to adapt the maximum size of MSG.3. The eNodeB can control the number of sequences in each subgroup according to the observed loads in each group.

The initial preamble transmission power setting is based on an open-loop estimation with full compensation for the path-loss. This ensures that the received power of the sequence is independent of the path-loss. The UE estimates the path-loss by averaging measurements of the downlink reference signal received power (RSRP). The eNodeB may also configure an additional power offset, depending, for example, on the desired received signal to interference plus noise ratio (SINR), the measured uplink interference and noise level in the time-frequency slots allocated to RACH preambles, and potentially on the preamble format.

In step 2, random access response (RAR), the RAR conveys the identity of the detected preamble (RAPID), a timing alignment instruction to synchronize subsequent uplink transmissions from the UE, an initial uplink resource grant for transmission of the Step 3 message, and an assignment of a temporary cell radio network temporary identifier (C-RNTI) (which may or may not be made permanent as a result of the next step—contention resolution).

The RAR is also scrambled with the random access radio network temporary identifier (RA-RNTI) when the RAR was detected and indicates the PRACH resource when the preamble was transmitted. The RAR message may also include a back off indicator that the eNodeB can set to instruct the UE to back off for a period of time before retrying a random access attempt.

The UE expects to receive the RAR within a time window, of which the start and end are configured by the eNodeB and broadcast as part of the cell-specific system information. If the UE does not receive a RAR within the configured time window, the UE selects another sequence to transmit again. The minimum delay for the transmission of another preamble after the end of the RAR window is 3 ms.

The eNodeB may configure preamble power ramping so that the transmission power for each transmitted preamble is increased by a fixed step. The eNodeB can configure the steps in power ramping in terms of power and the maximum number of attempts in total before declaring random access failure.

In step 3, message 3 transmission, MSG.3 is the first scheduled uplink transmission on the physical uplink shared channel (PUSCH) and uses a hybrid automatic repeat request (HARQ). It is addressed to the temporary C-RNTI allocated in the RAR and, for handovers, carries the provided C-RNTI.

If a preamble collision occurred at Step 1, the colliding UEs will receive the same temporary C-RNTI through the RAR and will also collide in the same uplink time-frequency resources when transmitting their L2/L3 message. This may result in such interference that no colliding UE can be decoded, and the UEs restart the random access procedure after reaching the maximum number of HARQ retransmissions. If one UE is successfully decoded, however, the contention remains unresolved for the other UEs. The following downlink message (in Step 4) allows a quick resolution of the contention.

In step 4, contention-resolution, the contention resolution message uses HARQ. It is addressed to the C-RNTI (if indicated in the MSG.3 message) or to the temporary C-RNTI, and, in the latter case, echoes the UE identity contained in MSG.3. In case of a collision followed by successful decoding of the MSG.3, the HARQ feedback is transmitted only by the UE which detects its own UE identity (or C-RNTI). Other UEs understand there was a collision, transmit no HARQ feedback, and quickly exit the current random access procedure to start another one.

A second type of random access is contention-free random access. When the UE performs contention-free (CF) RA, it uses a dedicated preamble. This means that the specific preamble cannot be used by any other UE, and consequently, the UE does not risk collision with another UE selecting the same preamble. CF random access requires that the UE obtains a dedicated preamble, which can be done either by radio resource control (RRC) signaling or by a physical downlink control channel (PDCCH) order.

For RRC configured CF RA, several situations may use RRC signaling to trigger a CF RA. Examples include, but are not limited to, the following: (a) beam recovery request (for New Radio (NR)); (b) system information (SI) request (for NR); (c) handover; and (d) uplink based positioning (for NR). In these cases, the dedicated resources can be signaled by RRC in the RACH-ConfigDedicated information element. The information element is described in 3GPP TS 36.331 section 6.3.2. An excerpt is reproduced below.

The IE RACH-ConfigDedicated is used to specify the dedicated random access parameters.

---
RACH-ConfigDedicated information element
---
-- ASN1START
RACH-ConfigDedicated ::=        SEQUENCE {
    ra-PreambleIndex            INTEGER (0..63),
    ra-PRACH-MaskIndex          INTEGER (0..15)
}
-- ASN1STOP ---
RACH-ConfigDedicated field descriptions
---
ra-PRACH-MaskIndex
Explicitly signalled PRACH Mask Index for RA Resource selection in TS 36.321 [6].
ra-PreambleIndex
Explicitly signalled Random Access Preamble for RA Resource selection in TS 36.321 [6].

---

Apart from dedicated RRC signaling, CF RA can also use dedicated resources for SI request which are signaled in NR SIB 1. In this case, the dedicated resource can be used by any UE requesting remaining minimum system information (RMSI). Collisions are not an issue because even if two UEs use the same preamble simultaneously, the network will send the SI which can be read by both UEs.

To summarize, the RACH-ConfigDedicated information element contains the preamble index and the PRACH Mask index (which indicates the PRACH resource to use) which are dedicated to a UE.

In PDCCH-triggered random access, two cases may use PDCCH orders to trigger RA. One case is when a connected UE is out-of-synchronization and downlink data is pending for the UE. In this case, the network sends a PDCCH order (DCI 1A) MAC CE which triggers a CF random access.

The other situation is when the UE performs random access on a secondary cell (SCell). Random access on an SCell can only be initiated by a PDCCH order. As of Release-11, a contention-based random access procedure is not supported on a SCell. Upon receiving the PDCCH order, the UE transmits a PRACH preamble on the SCell for which the PDCCH order is intended. The RAR reception takes place on the primary cell (PCell) using RA-RNTI in common search space. The grant received in RAR is valid for the SCell on which the PRACH preamble was transmitted. When the UE receives RAR for a SCell, the UE applies the timing advance command received in the RAR to the secondary timing advance group (sTAG) to which the SCell belongs.

The PDCCH order format is specified for LTE in 3GPP TS 36.212, section 5.3.3.1.3. An excerpt is reproduced below.

DCI format 1A is used for the compact scheduling of one PDSCH codeword in one cell and random access procedure initiated by a PDCCH order. The DCI corresponding to a PDCCH order can be carried by PDCCH or EPDCCH.

The following information is transmitted by means of the DCI format 1A: (a) carrier indicator—0 or 3 bits; and (b) flag for format0/format1A differentiation or flag for format0A/format1A differentiation—1 bit, where value 0 indicates format 0 or format 0A and value 1 indicates format 1A.

Format 1A is used for random access procedure initiated by a PDCCH order only if format 1A CRC is scrambled with C-RNTI and all the remaining fields are set as follows: (a) localized/distributed VRB assignment flag—1 bit is set to 'O'; (b) resource block assignment—$\lceil \log_2 (N_{RB}^{DL}(N_{RB}^{DL}+1)/2) \rceil$ bits, where all bits shall be set to 1; (c) preamble index—6 bits; (d) PRACH Mask Index—4 bits; and (d) all the remaining bits in format 1A for compact scheduling assignment of one PDSCH codeword are set to zero. Accordingly, similar to RRC signaling, the PDCCH order contains the preamble index and the PRACH mask index and is scrambled by the UEs C-RNTI.

3GPP may specify a preamble/PRACH resource to SSB association. For example, a UE may indicate a SS block (SSB) index of the best SS block (i.e., indicating the best downlink beam from the gNB) with PRACH resources and/or preambles.

Because the random access procedure is never used only to indicate the best SSB, any association to an SSB is also coupled to another association, e.g. preambleGroupA or preambleGroupB, request for SI or dedicated preamble.

The preamble mappings to categories must be done for each SSB. With an equal number of preambles associated with each SS-block in an SS-burst set, then the maximum number of preambles in each cell, denoted by N, can be written as N=L·Q where L is the maximum number of SS-blocks and Q is the number of preambles associated to each SS-block. Because the number of SSBs can be up to 64 when using wide sub-carrier spacing, the total number of preambles per cell will in many cases be larger than the 64 in LTE.

FIG. 2 illustrates an example of preamble allocation for two synchronization signal blocks (SSBs). The illustrated example includes two SSBs (SSB1 and SSB2). The first three preambles are configured for preambleGroupA and SSB 1, the 4th and 5th are assigned to indicate preamble-GroupB and SSB 1. Preamble 6 and 7 are configured in the same way to indicate SI requests and SSB 1. Finally, the 8th and 9th preamble are reserved for dedicated preambles and SSB1. For SSB2, the corresponding configuration is done and can be deduced from the configuration of preamble 1 to preamble 9 and the knowledge that there are two SSBs. A consequence of the mapping is that the network needs to dedicate several preambles/PRACH resources to a UE if the best SSB is not known, or for the case when the UE will change SSB.

The 3GPP specifications may include the following features, and are listed here for context. At least for the case without gNB Tx/Rx beam correspondence, a gNB can configure an association between a downlink signal/channel, a subset of RACH resources, and/or a subset of preamble indices, for determining Msg2 downlink Tx beam. Based on the downlink measurement and the corresponding association, a UE selects the subset of RACH resources and/or the subset of RACH preamble indices. A preamble index consists of preamble sequence index and orthogonal cover code (OCC) index, if OCC is supported. A subset of preambles can be indicated by OCC indices.

An association between one or multiple occasions for SS block and a subset of RACH resources and/or subset of preamble indices may be obtained by a UE through broadcast system information, through dedicated signaling, or may be known to the UE. A gNB may configure an association between CSI-RS for L3 mobility and a subset of RACH resources and/or a subset of preamble indices for determining Msg2 DL Tx beam.

NR supports indication of PRACH resource allocation for non-contention based random access for a UE. PRACH resource refers to time/frequency/code resources of the PRACH preamble.

Random access configuration is included in the remaining minimum SI (RMSI). All random access configuration information may or may not be transmitted in all beams used for RMSI within a cell. The network may or may not be mandated to use the same set of beams for RMSI and SS block. SS block and RMSI may or may not be spatial quasi-colocated. Particular configurations may or may not be applicable to all subcarrier spacings.

A UE calculates the PRACH transmit power for a retransmission at least based on the most recent estimate of pathloss and power ramping. The pathloss is measured at least on the SS block associated with the PRACH resources/preamble subset. Regarding UE behavior when reaching the maximum power, if the recalculated power is still at or above the Pc,max, then the UE can transmit at maximum power even if it changes its TX beam.

All random access configuration information may be broadcasted in all beams used for RMSI within a cell (i.e., RMSI information is common for all beams).

For contention-based random access, an association between an SS block in the SS burst set and a subset of RACH resources and/or preamble indices is configured by a set of parameters in RMSI. The same set of parameters may be used for different cases if possible (e.g., analog/hybrid/digital beamforming at gNB, level of gNB beam correspondence, number of SS blocks, number of frequency multiplexed PRACH resources, PRACH resource density in time, etc.). The set of parameters may be kept to a minimum number. The number of SS blocks may refer to the number of SS blocks (if indicated in RMSI or MIB), e.g. the actually transmitted SS blocks, or the maximum number, referred to as L.

A particular UE implementation may determine how to select the SS block and corresponding PRACH resource for path-loss estimation and (re)transmission based on SS blocks that satisfy threshold(s). If a UE does not detect a SS block that satisfies the threshold(s), the UE has the flexibility to select any SS block that enables the UE to meet the target received power of the RACH preamble with its maximum transmit power.

A UE has flexibility to select its RX beam to find the list of SS blocks that satisfy the threshold(s). Threshold(s) for SS block selection may be configured or fixed in a specification. A counter of power ramping when a UE changes its selected SS-block in message 1 retransmission may be unchanged.

A UE may compute pathloss based on SS block transmit power and SS block RSRP. At least one SS block transmit power value is indicated to the UE in RMSI and may include multiple values. Different SS blocks in an SS burst set can be transmitted with different power and/or with different Tx beamforming gain, at least as a network implementation.

NR defines the pattern of the slots that contain PRACH resource(s) into a larger time interval. For example, NR may define a particular time interval (e.g., 5/10/20 ms), and may define a pattern based on, for example, numerology of the slot, such as SS block, uplink/downlink, Msg1 or PUSCH. Within each slot, RACH resources within a slot may be consecutive, or RACH resources within a slot are not consecutive (e.g., for control resource set (CORESET) monitoring in the 2/4/7 symbols).

At least for initial access, the association between SS blocks and RACH preamble indices and/or RACH resources may be based on the actually transmitted SS blocks indicated in RMSI. RMSI indicates only a single transmit power for SS blocks in Rel-15. For initial access, a threshold for SS block selection for RACH resource association is configurable by the network, where the threshold is based on RSRP. A specification may include ping-pong effect handling.

There currently exist certain challenges. In NR, there are some aspects that differ from LTE that may impact the UE behavior during random access. One change is that each NR cell can have multiple SSB sets comprised of one or multiple SSBs that can be transmitted in different beams (or directions). For each of these beams or directions, there can be some differences in the PRACH resource configuration. Thus, in NR, before initiating random access the UE performs beam selection (or SSB selection) within a cell to derive the PRACH resources that should be used, such as time/frequency resources and sequence(s).

When a PDCCH order triggers a contention—free random access, there is a need to include several preambles to enable the UE to select the preamble that corresponds to the best SSB. This will impact the size of the PDCCH order and potentially make it impossible to send in this form.

SUMMARY

Certain aspects of the present disclosure and their embodiments may provide solutions to the challenges described above. For example, particular embodiments comprise signaling a set of dedicated preambles and physical random access channel (PRACH) resources (e.g., PRACH mask index) mapped to different system synchronization blocks (SSBs). When a user equipment (UE) receives a physical downlink control channel (PDCCH) order indicating one of the dedicated preambles, the UE may choose any of the previous set of preambles (the one corresponding to the best SSB) for the contention-free random access.

According to some embodiments, a method in a wireless device of performing random access comprises receiving a random access configuration. The random access configuration comprises one or more associations of a SSB, a preamble sequence, and PRACH resources. The PRACH resources comprise time domain resources and frequency domain resources. The method further comprises receiving one or more SSBs; selecting one of the one or more received SSBs; and selecting a preamble sequence. The preamble sequence is associated with the selected SSB in the random access configuration. The method further comprises transmitting the selected preamble sequence on PRACH resources associated with the selected SSB in the random access configuration.

In particular embodiments, more than one SSB is associated with identical PRACH resources. The preamble sequence associated with each of the more than one SSBs identifies the SSB with respect to the PRACH resources.

In particular embodiments, receiving the random access configuration includes receiving a PDCCH order or radio resource control (RRC) message. Receiving the random access configuration may comprise receiving one or more sets of preamble sequences, and the received PDCCH order or RRC message includes an index indicating a set of preamble sequences of the one or more sets of preamble sequences. Receiving the PDCCH order may comprise receiving a plurality of PDCCH orders, each PDCCH order received from a different direction and each PDCCH order associated with a respective preamble sequence or a respective PRACH resource.

In particular embodiments, receiving the random access configuration is performed in a primary cell and receiving the one or more SSBs is performed in a secondary cell.

According to some embodiments, a wireless device is capable of performing a random access procedure. The wireless device comprises processing circuitry operable to receive a random access configuration. The random access configuration comprises one or more associations of a SSB, a preamble sequence, and PRACH resources. The PRACH resources comprise time domain resources and frequency domain resources. The processing circuitry is further operable to receive one or more SSBs; select one of the one or more received SSBs; and select a preamble sequence. The preamble sequence is associated with the selected SSB in the random access configuration. The processing circuitry is further operable to transmit the selected preamble sequence on PRACH resources associated with the selected SSB in the random access configuration.

In particular embodiments, more than one SSB is associated with identical PRACH resources. The preamble sequence associated with each of the more than one SSBs identifies the SSB with respect to the PRACH resources.

In particular embodiments, the processing circuitry is operable to receive the random access configuration by receiving a PDCCH order or RRC message. The processing circuitry may be operable to receive the random access configuration by receiving one or more sets of preamble sequences, and the received PDCCH order or RRC message includes an index indicating a set of preamble sequences of the one or more sets of preamble sequences. The processing circuitry may be operable to receive the PDCCH order by receiving a plurality of PDCCH orders, each PDCCH order received from a different direction and each PDCCH order associated with a respective preamble sequence or a respective PRACH resource.

In particular embodiments, the processing circuitry is operable to receive the random access configuration in a primary cell and the processing circuitry is operable to receive the one or more SSBs in a secondary cell.

According to some embodiments, a method in a network node of performing random access comprises sending a random access configuration to a wireless device. The random access configuration comprises one or more associations of a SSB, a preamble sequence, and PRACH resources. The PRACH resources comprise time domain resources and frequency domain resources. The method further comprises broadcasting a plurality of SSBs; and receiving a random access request on particular PRACH resources. The random access request includes a preamble sequence. The method further comprises determining an association of the received random access request and a SSB of the plurality of SSBs based on the particular PRACH resources, the preamble sequence, and the random access configuration.

In particular embodiments, more than one SSB is associated with identical PRACH resources. The preamble sequence associated with each of the more than one SSBs identifies the SSB with respect to the PRACH resources.

In particular embodiments, sending the random access configuration includes transmitting a PDCCH order or RRC message to the wireless device. Sending the random access configuration may comprise transmitting one or more sets of preamble sequences to the wireless device. The transmitted PDCCH order or RRC message includes an index indicating a set of preamble sequences of the one or more sets of preamble sequences. Transmitting the PDCCH order may comprise transmitting a plurality of PDCCH orders, each PDCCH order transmitted in a different direction and each PDCCH order associated with a respective preamble sequence or a respective PRACH resource.

In particular embodiments, sending the random access configuration is performed in a primary cell and broadcasting the plurality of SSBs is performed in a secondary cell.

According to some embodiments, a network node is capable of performing a random access procedure. The network node comprises processing circuitry operable to send a random access configuration to a wireless device. The random access configuration comprises one or more associations of a SSB, a preamble sequence, and PRACH resources. The PRACH resources comprise time domain resources and frequency domain resources. The processing circuitry is further operable to broadcast a plurality of SSBs and receive a random access request on particular PRACH resources. The random access request includes a preamble sequence. The processing circuitry is further operable to determine an association of the received random access request and a SSB of the plurality of SSBs based on the particular PRACH resources, the preamble sequence, and the random access configuration.

In particular embodiments, more than one SSB is associated with identical PRACH resources. The preamble sequence associated with each of the more than one SSBs identifies the SSB with respect to the PRACH resources.

In particular embodiments, the processing circuitry is operable to send the random access configuration by transmitting a PDCCH order or RRC message to the wireless device. The processing circuitry may be operable to send the random access configuration by transmitting one or more sets of preamble sequences to the wireless device. The transmitted PDCCH order or RRC message includes an index indicating a set of preamble sequences of the one or more sets of preamble sequences. The processing circuitry may be operable to transmit the PDCCH order by transmitting a plurality of PDCCH orders, each PDCCH order transmitted in a different direction and each PDCCH order associated with a respective preamble sequence or a respective PRACH resource.

In particular embodiments, the processing circuitry is operable to send the random access configuration in a primary cell and the processing circuitry is operable to broadcast the plurality of SSBs in a secondary cell.

Also disclosed is a computer program product. The computer program product comprises instructions stored on non-transient computer-readable media which, when executed by a processor, perform the steps of: receiving a random access configuration; receiving one or more SSBs; selecting one of the one or more received SSBs; selecting a preamble sequence; and transmitting the selected preamble sequence on PRACH resources associated with the selected SSB in the random access configuration.

Another computer program product comprises instructions stored on non-transient computer-readable media which, when executed by a processor, perform the steps of: sending a random access configuration to a wireless device; broadcasting a plurality of SSBs; receiving a random access request on particular PRACH resources; and determining an association of the received random access request and a SSB of the plurality of SSBs based on the particular PRACH resources, the preamble sequence, and the random access configuration.

Proposed herein are various embodiments that address one or more of the issues disclosed herein. Certain embodiments may provide one or more of the following technical advantages. According to certain embodiments, the format of PDCCH order can be kept and several different preambles can be used although only one is signaled in the PDCCH order. These and other technical advantages may be readily apparent to ones of ordinary skill in the art. Some embodiments may provide some, all, or none of these technical advantages.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

In particular embodiments, the network (e.g., gNB) provides the user equipment (UE) a dedicated random access configuration for each SSB. The random access configuration consists of at least one or more random access sequences (preambles), and time and frequency configurations (physical resource blocks) of the random access occasion.

The system synchronization block (SSB) is associated with a physical random access (PRACH) resource, but the mapping is not always one-to-one. For example, a group of SSBs may be associated with the same PRACH resource. Thus, the PRACH resource used for the preamble transmission informs the gNB of which group of SSB beams the UE has selected. To know which of the SSB beams within the group was selected, the gNB needs more information.

One solution includes preamble partitioning. Disjoint sets of preambles are allocated to each of the SSB beams in the group of SSB beams. The PRACH resource indicates the SSB beam group and the preamble indicates the SSB beam within the group. Because the next group of SSB beams is associated with another PRACH resource, the same preambles can be reused for the next group. The number of preambles to support the preamble partitioning scheme is therefore independent of the total number of SSBs in an SS Burst Set. The number of supported preambles only depends on the number of SSBs in a group of SSBs that are associated with the same PRACH resource.

According to certain embodiments, a method is performed by a UE. An example is illustrated in FIG. 3.

Figure 1:
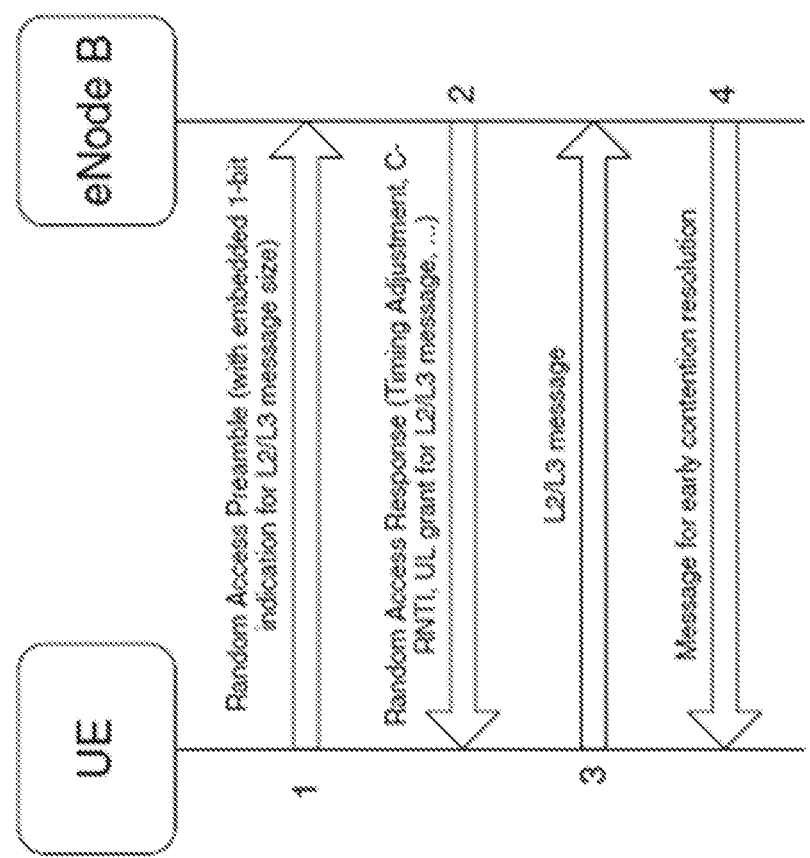
FIG. 1 is a flow diagram illustrating an example contention-base random access procedure.
Figure 2:
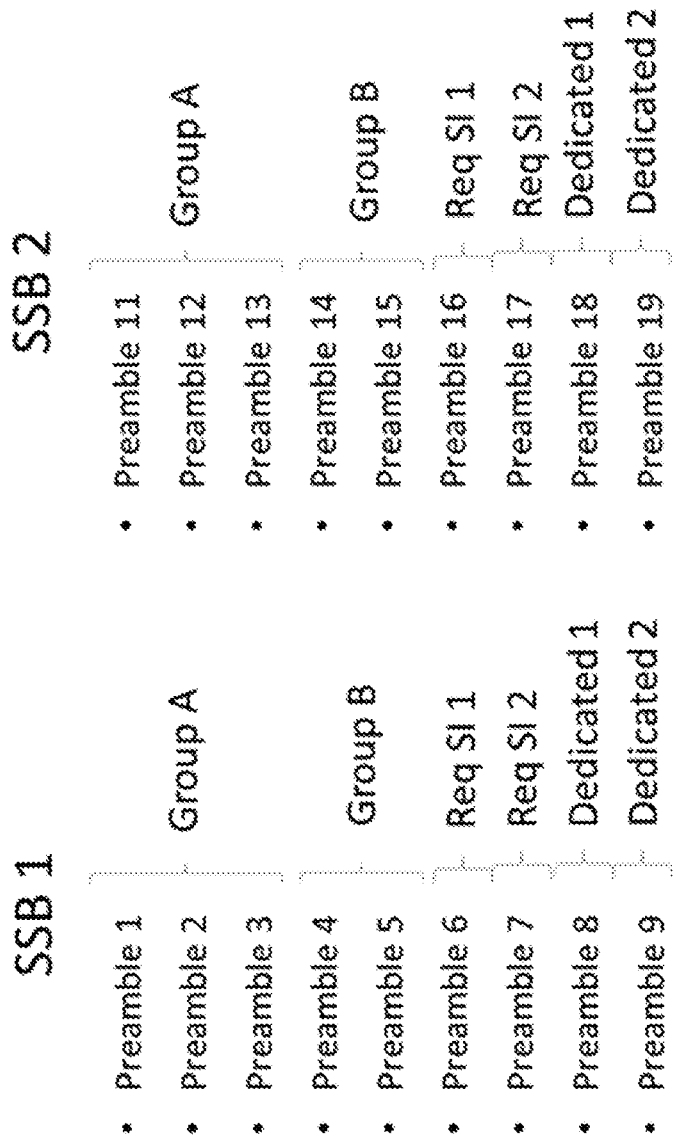
FIG. 2 illustrates an example of preamble allocation for two synchronization signal blocks (SSBs)
Figure 3:
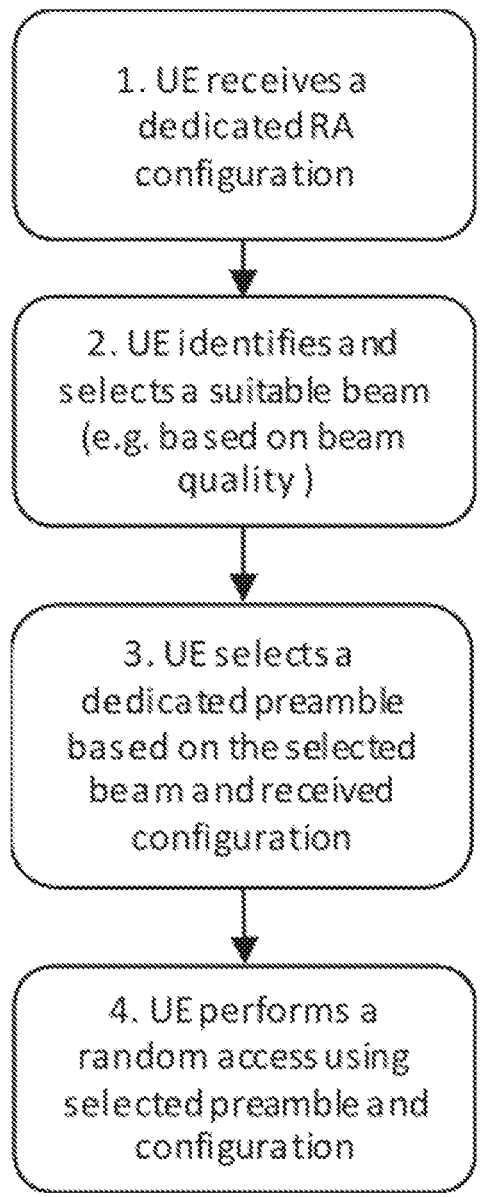
FIG. 3 is a flow diagram illustrating an example method in a wireless device of performing random access, according to some embodiments.

FIG. 3 is a flow diagram illustrating an example method in a wireless device of performing random access, according to some embodiments. According to certain embodiments, at Step 1 the network (e.g., gNB) provides the UE with dedicated preambles for each SSB. The preambles are chosen so that the network may identify the selected SSB based on the received preamble. An example of such a configuration is illustrated in FIG. 2 where the dedicated preamble 8 is associated to SSB1 and preamble 18 is associated to SSB2, although it will be appreciated that other variations may be used.

The network may then trigger a contention-free random access by physical downlink control channel (PDCCH)

order or by radio resource control (RRC) message. Upon receiving the PDCCH order or RRC message, at Step 2 the UE selects a suitable SSB and performs random access using the dedicated preamble corresponding to the selected SSB and corresponding random access configuration (i.e., the UE transmits the dedicated preamble on the configured PRACH resources).

According to certain embodiments, the network provides the UE with a set of dedicated preambles. The sets of preambles are chosen so that the network may identify the selected SSB based on the received preamble. An example of such a configuration is also illustrated in FIG. 2, where dedicated preamble 8 and 18 are included in set 1 and preambles 9 and 19 are included in set 2 (although various other configurations may be used).

The network may trigger a contention-free random access by PDCCH order containing a pointer to one of the sets. The pointer may be the index of the chosen set (e.g., 1 for set 1) or one of the preambles included in the set (e.g., 8 or 18 for set 1). The network may also trigger the random access by an RRC message. Upon receiving the command, the UE selects a suitable SSB and performs random access using the dedicated preamble corresponding to the signaled group and selected SSB, as illustrated in Steps 3 and 4.

According to certain embodiments, only one group of dedicated preambles (e.g., "dedicated 3") is configured for a UE with dedicated RRC signaling. Also, in the group each preamble has an association with a specific SSB. As above, when one of the dedicated preambles in the group is signaled to a UE, either in a PDCCH order or as an IE in an RRC message triggering a random access, the UE can choose any of the two preambles in the group for the contention free random access depending on which SSB the UE selects and wishes to indicate.

According to certain embodiments, the SSB is indicated by different PRACH configurations. The PRACH mask index in the triggering message (PDCCH order or RRC message) must be such that it allows transmissions of the dedicated preamble in PRACH occasions indicating all different SSBs in the cell.

According to certain embodiments, the number preambles in the set of preambles associated with each SSB block is of equal size and the indication in the PDCCH order is the offset in the set associated with the SSB the UE selects.

According to additional embodiments, the network may instruct the UE to perform contention-free random access to obtain a timing advance so that the network can deliver downlink data to the UE. If the gNB supports directional reciprocity (i.e., the ability to select a proper downlink beam for transmission to a UE based on a received transmission from the UE so that the gNB essentially transmits towards the UE in the opposite direction as it received the transmission from the UE), then the UE may use a single PRACH resource and a single preamble.

In other embodiments, the gNB may not support or rely on directional reciprocity. In these embodiments, a PDCCH order may be transmitted to the UE. If a relatively large amount of time has passed since the last communication between the UE and the gNB, then the gNB may not have maintained a downlink beam. Thus, the gNB does not know precisely where the UE is, and the gNB consequently transmits the PDCCH order in full or partial beam sweep. In this sweep, the gNB may include a different dedicated preamble in each transmission, but it is preferable that the same PRACH resource is not used for too many PDCCH transmissions/beams, so that the same preambles can be reused, if needed, in order not to use too many of the preambles available in the cell. The preamble subsequently received from the UE (together with the used PRACH resource) indicates the preferred downlink beam that will be used for the random access response (RAR). The PRACH resource may be indicated in the PDCCH order. An alternative is to let the UE use preambles and PRACH resources associated with the SSB transmissions (see below).

According to some embodiments, the PDCCH order for some reason cannot be used (or the network does not want to use it) for downlink beam selection and the UE selects a downlink beam from the SSB transmissions. According to these embodiments, it is assumed that a group of SSBs are associated with each PRACH resource. Thus, the PRACH resource identifies the group of SSBs, and the dedicated preambles identify a single SSB/beam within the group. The PDCCH order allocates a set of dedicated preambles, one preamble for each beam in the group of SSB beams. To minimize the size of the DCI message, the set of dedicated preambles may have sequential preamble indexes. Thus, only the first of the preamble indexes has to be included or indicated in the PDCCH order and the remaining dedicated preambles will follow implicitly. The UE may know the number of preambles from the system information; otherwise the number of dedicated preambles may be indicated in the PDCCH order.

According to some embodiments, the UE performs random access in a SCell. For example, the network sends a PDCCH order in the PCell to instruct the UE to perform a random access in a newly configured SCell. The random access not only provides a valid timing advance to the UE, but also confirms to the network that the UE has applied the SCell configuration.

The PDCCH order is transmitted in the PCell and the UE receives the SSB in the SCell (and may possibly already have done it) to select a downlink beam. The PDCCH order may, as described above, include or indicate a single dedicated preamble index that indicates the start index of a set of dedicated preambles with sequential indexes, each matching the SSB within a group of SSBs associated with the same PRACH resource in the SCell (and the UE is assumed to know the size of such an SSB group from the system information or SCell configuration, and thus also knows the number of dedicated preambles it has been assigned).

If such PRACH resources (including associations with SSBs) do not exist in the SCell on a regular basis, they may be configured for the particular one-time purpose (e.g., configured together with the other SCell configuration data). The configuration may also be included in the system information, but known to be "non-active" in the regular case, and activated for the purpose of PDCCH ordered random access.

The situation described above targets a scenario where the SgNB (which serves the SCell) does not support directional reciprocity. If the SgNB supports digital RX beamforming and directional reciprocity, it can listen for the preamble in all directions and send the response in the opposite direction. In this case only a single dedicated preamble and a single PRACH resource is needed.

The various embodiments have been described above relating to UEs and network nodes operating in a wireless network. These elements are described in more detail below.

Figure 4:
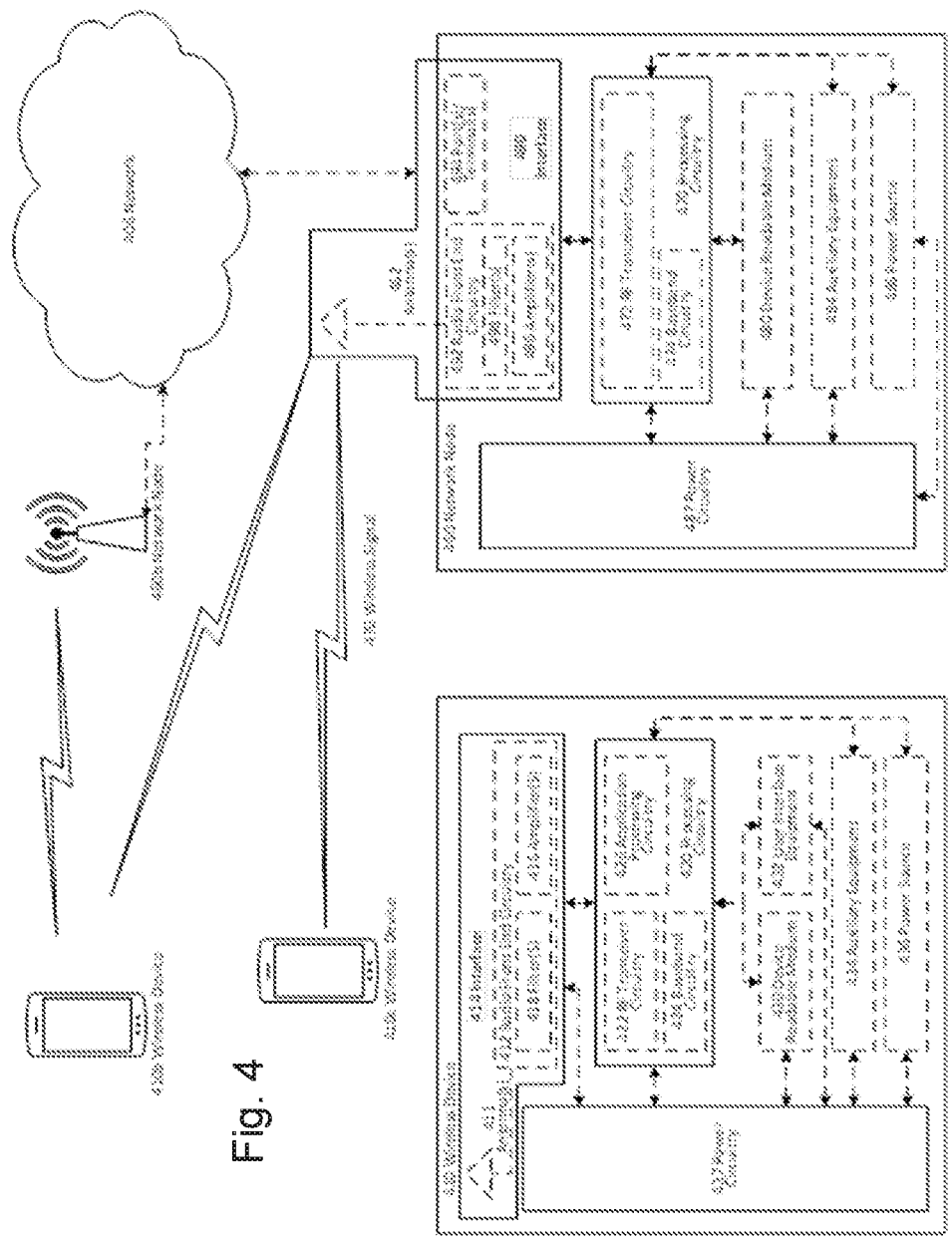
FIG. 4 is a block diagram illustrating an example wireless network, according to a particular embodiment.

Although the subject matter described herein may be implemented in any appropriate type of system using any suitable components, the embodiments disclosed herein are described in relation to a wireless network, such as the example wireless network illustrated in FIG. 4.

FIG. 4 is a block diagram illustrating an example wireless network, according to a particular embodiment. For simplicity, the wireless network of FIG. 4 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein (e.g., the methods described with respect to FIGS. 3 and 14, among others). Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signaling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD may support device-to-device (D2D) communication, for example, by implementing a 3GPP standard for sidelink communication, and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411.

In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414.

Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411.

Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein (e.g., the methods described with respect to FIGS. 3 and 13, among others). For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components.

In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected).

User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
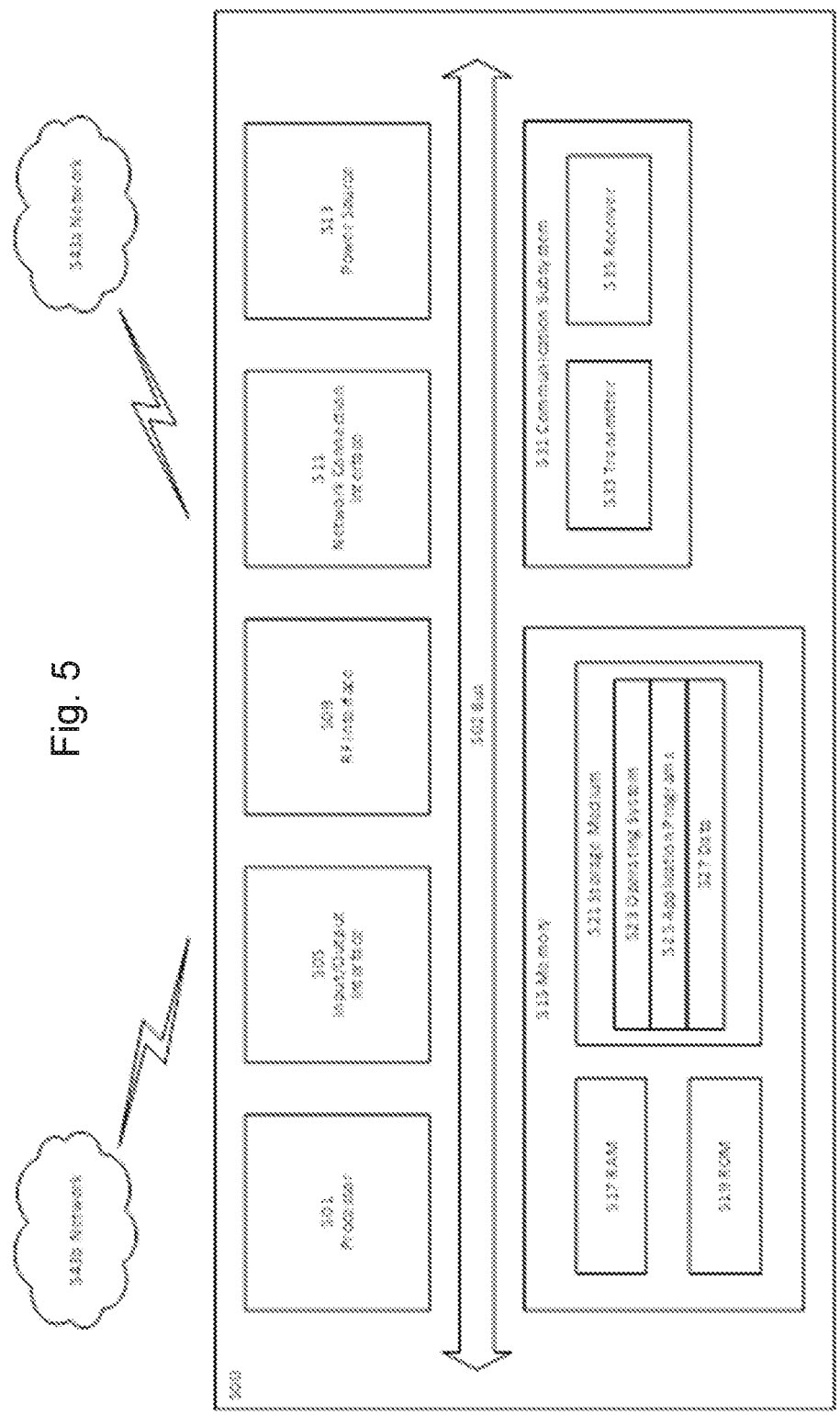
FIG. 5 is a block diagram illustrating an example user equipment, according to some embodiments.

FIG. 5 is a block diagram illustrating an example user equipment, according to some embodiments. FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE 500, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 5 illustrates a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543*b* using communication subsystem 531. Network 543*a* and network 543*b* may be the same network or networks or different network or networks. Communication subsystem 531 may be configured to include one or more transceivers used to communicate with network 543*b*. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543*b* may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
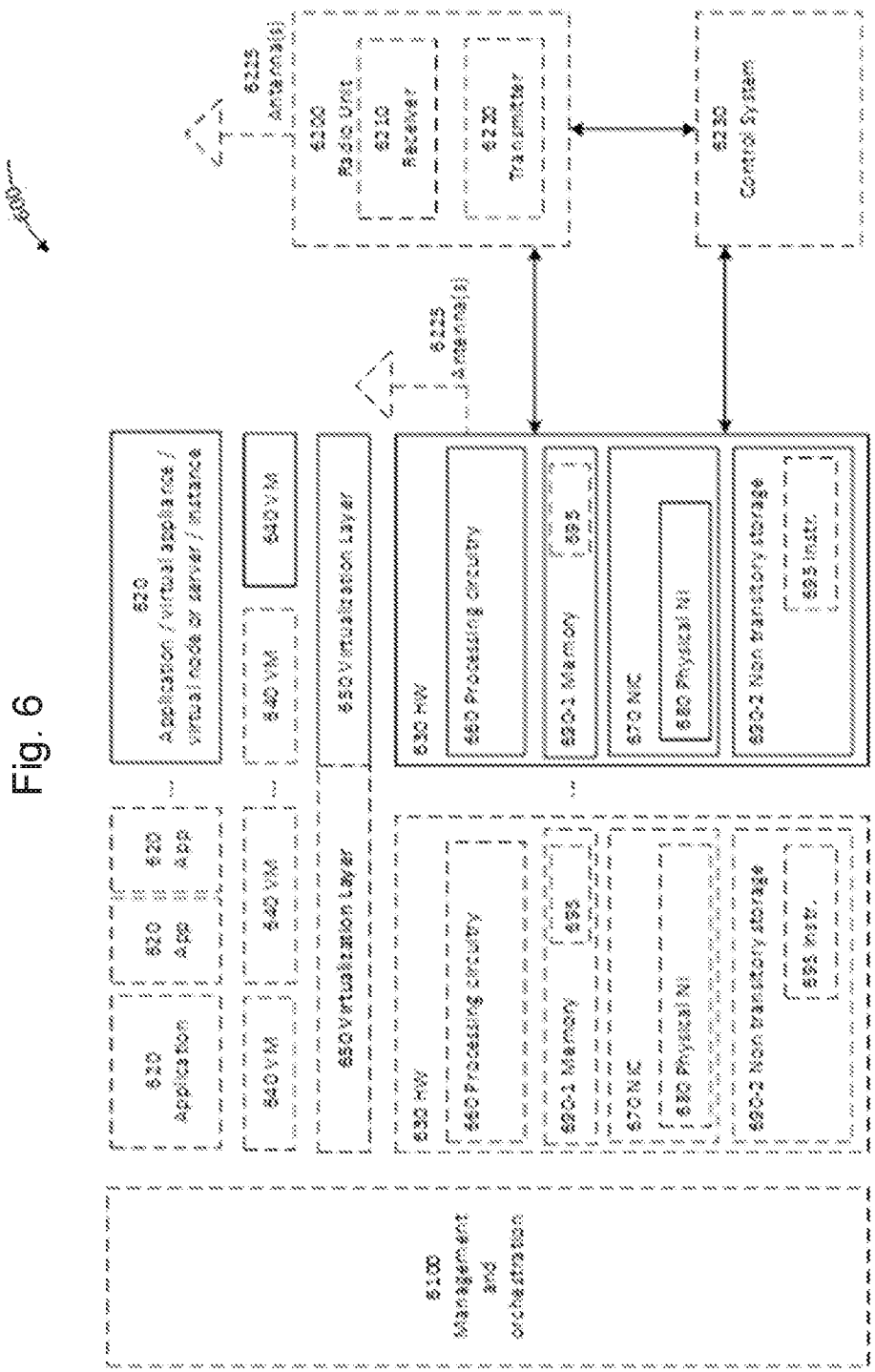
FIG. 6 is a block diagram illustrating a virtualization environment, according to some embodiments.

FIG. 6 is a block diagram illustrating a virtualization environment, according to some embodiments. FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signaling can be effected with the use of control system 6230 which may alternatively be used for communication between the hardware nodes 630 and radio units 6200.

Figure 7:
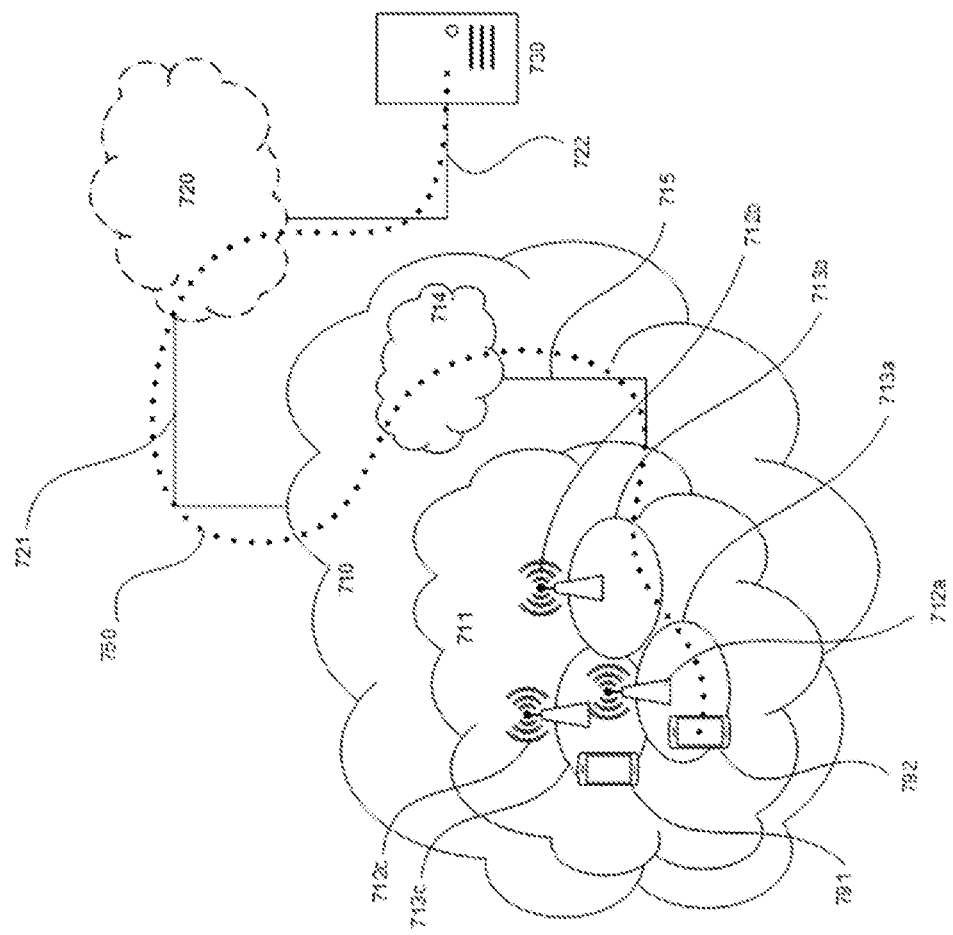
FIG. 7 is a block diagram illustrating a telecommunication network connected via an intermediate network to a host computer, according to some embodiments.

FIG. 7 is a block diagram illustrating a telecommunication network connected via an intermediate network to a host computer, according to some embodiments. In accordance with an embodiment, a communication system includes telecommunication network 710, such as a 3GPP-type cellular network, which comprises access network 711, such as a radio access network, and core network 714.

Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet. In particular, intermediate network 720 may comprise two or more sub-networks (not shown).

The communication system of FIG. 7 as a whole enables connectivity between the connected UEs 791, 792 and host computer 730. The connectivity may be described as an over-the-top (OT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
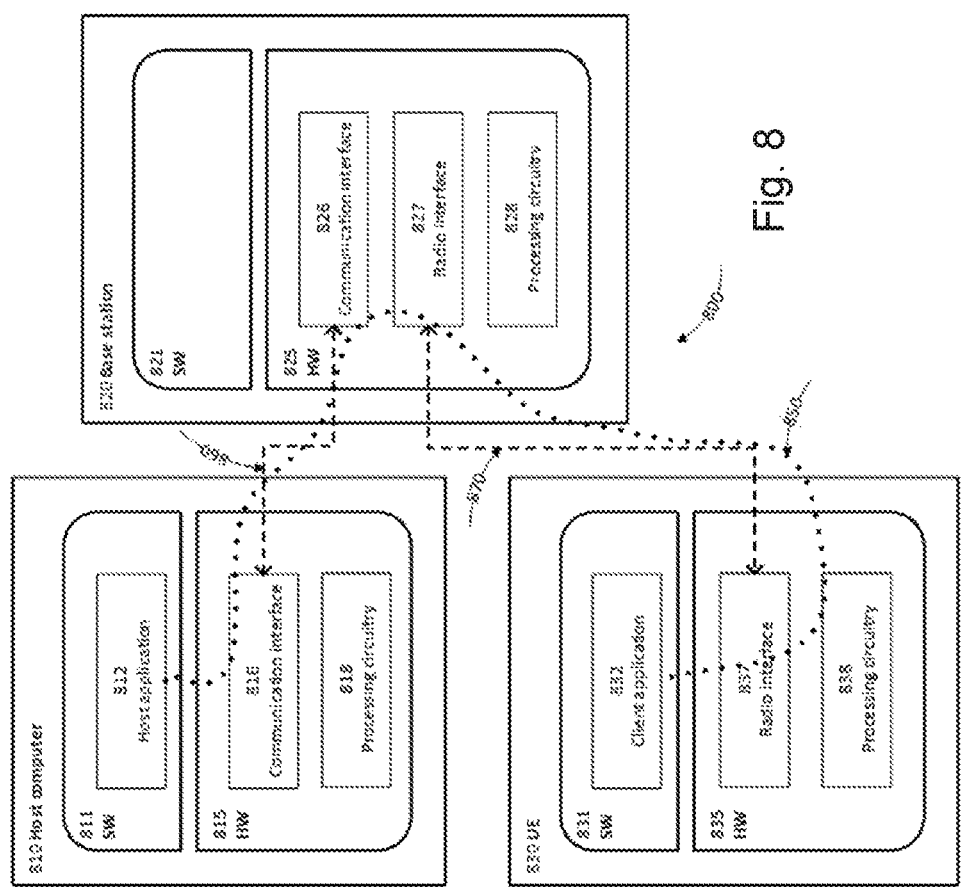
FIG. 8 is a block diagram illustrating a host computer communicating via a base station with a user equipment over a partially wireless connection, according to some embodiments.

FIG. 8 is a block diagram illustrating a host computer communicating via a base station with a user equipment over a partially wireless connection, according to some embodiments. Example implementations of the UE, base station and host computer described in the preceding paragraphs are described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities.

In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812.

Host application 812 may be operable to provide a service to a remote user, such as UE 830 connecting via OT connection 850 terminating at UE 830 and host computer 810. In providing the service to the remote user, host application 812 may provide user data which is transmitted using OT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810.

Connection 860 may be direct, or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions.

UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the latency and power consumption, and thereby provide benefits such as reduced user waiting time, relaxed restriction on file size, better responsiveness, and extended battery lifetime.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both.

In embodiments, sensors (not shown) may be deployed in or in association with communication devices through which OT connection 850 passes; the sensors may participate in the measurement procedure by supplying values of the monitored quantities exemplified above, or supplying values of other physical quantities from which software 811, 831 may compute or estimate the monitored quantities.

The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art.

In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
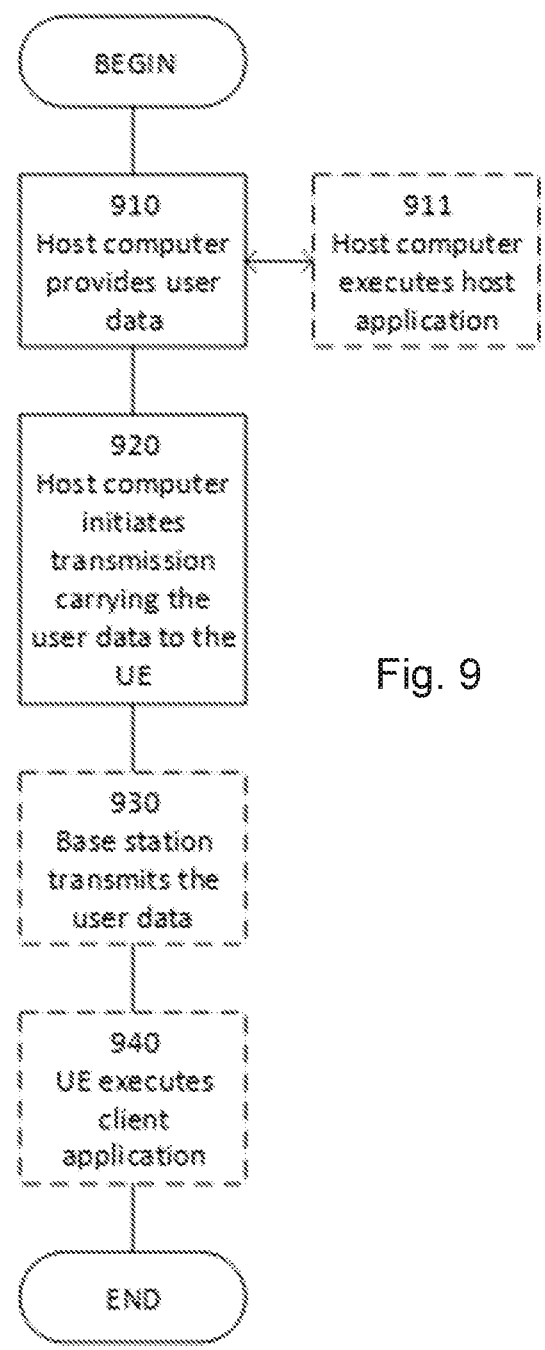
FIG. 9 is a flow diagram illustrating an example method in a communication system including a host computer, a base station and a user equipment.

FIG. 9 is a flow diagram illustrating an example method in a communication system including a host computer, a base station, and a user equipment. The communication system includes a host computer, a base station and a UE which may be those described with reference to FIGS. 7 and 8. For simplicity of the present disclosure, only drawing references to FIG. 9 will be included in this section.

In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
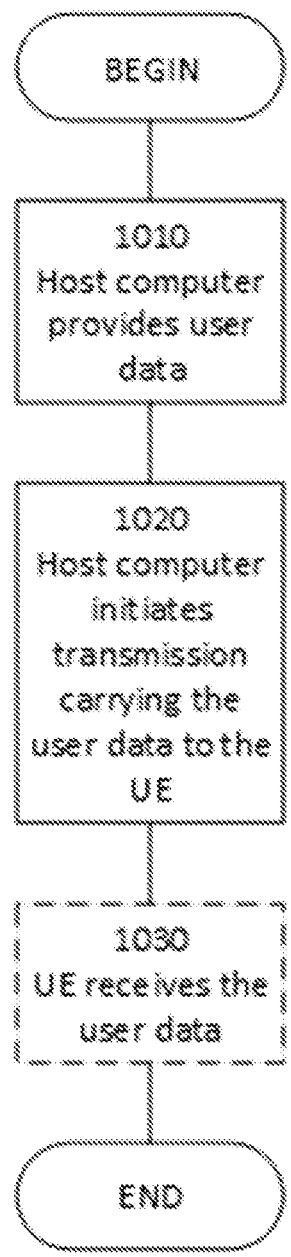
FIG. 10 is a flow diagram illustrating another example method in a communication system including a host computer, a base station and a user equipment.

FIG. 10 is a flow diagram illustrating another example method in a communication system including a host computer, a base station, and a user equipment. The communication system includes a host computer, a base station and a UE which may be those described with reference to FIGS. 7 and 8. For simplicity of the present disclosure, only drawing references to FIG. 10 will be included in this section.

In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
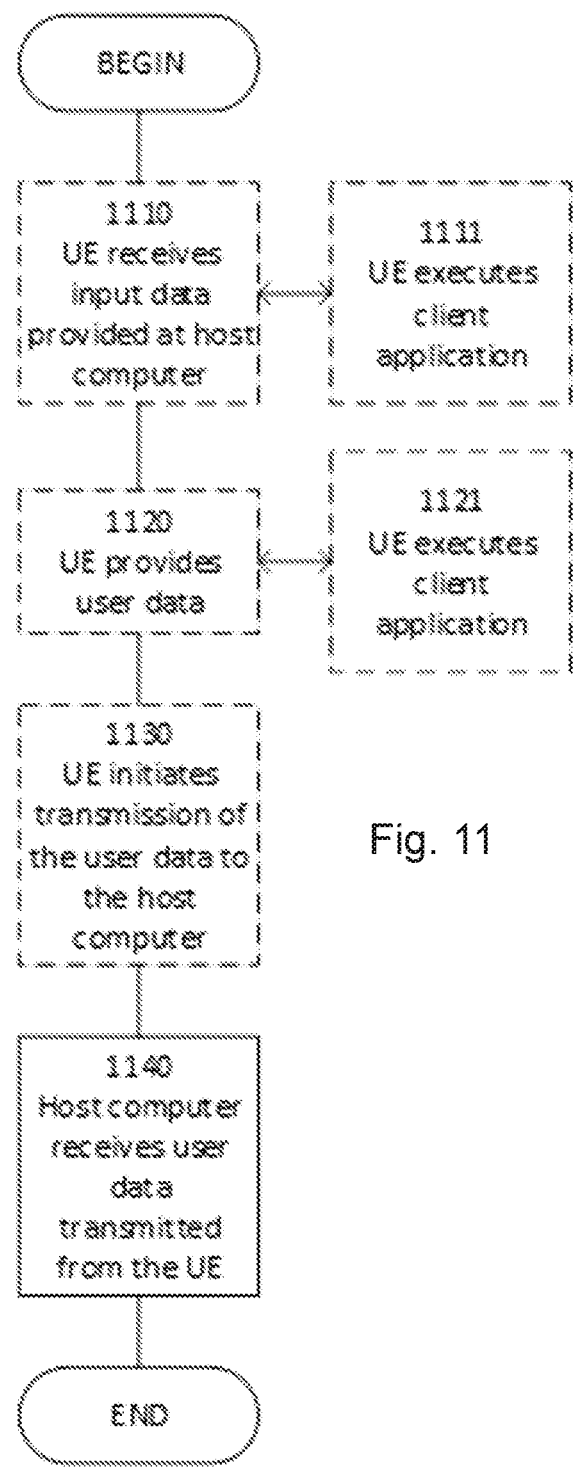
FIG. 11 is a flow diagram illustrating an additional example method in a communication system including a host computer, a base station, and a user equipment.

FIG. 11 is a flow diagram illustrating an additional example method in a communication system including a host computer, a base station, and a user equipment. The communication system includes a host computer, a base station and a UE which may be those described with reference to FIGS. 7 and 8. For simplicity of the present disclosure, only drawing references to FIG. 11 will be included in this section.

In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
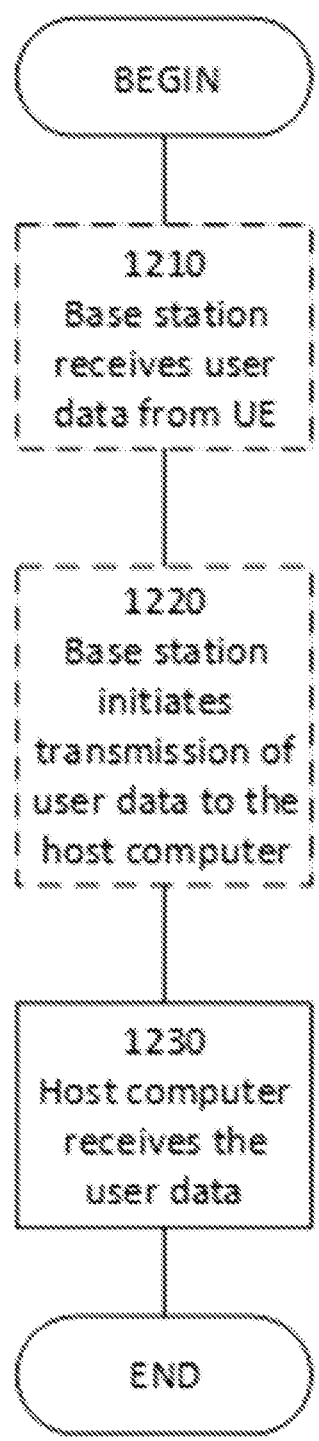
FIG. 12 is a flow diagram illustrating another method in a communication system including a host computer, a base station, and a user equipment, according to a particular embodiment.

FIG. 12 is a flow diagram illustrating another method in a communication system including a host computer, a base station, and a user equipment, according to a particular embodiment. The communication system includes a host computer, a base station and a UE which may be those described with reference to FIGS. 7 and 8. For simplicity of the present disclosure, only drawing references to FIG. 12 will be included in this section.

In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
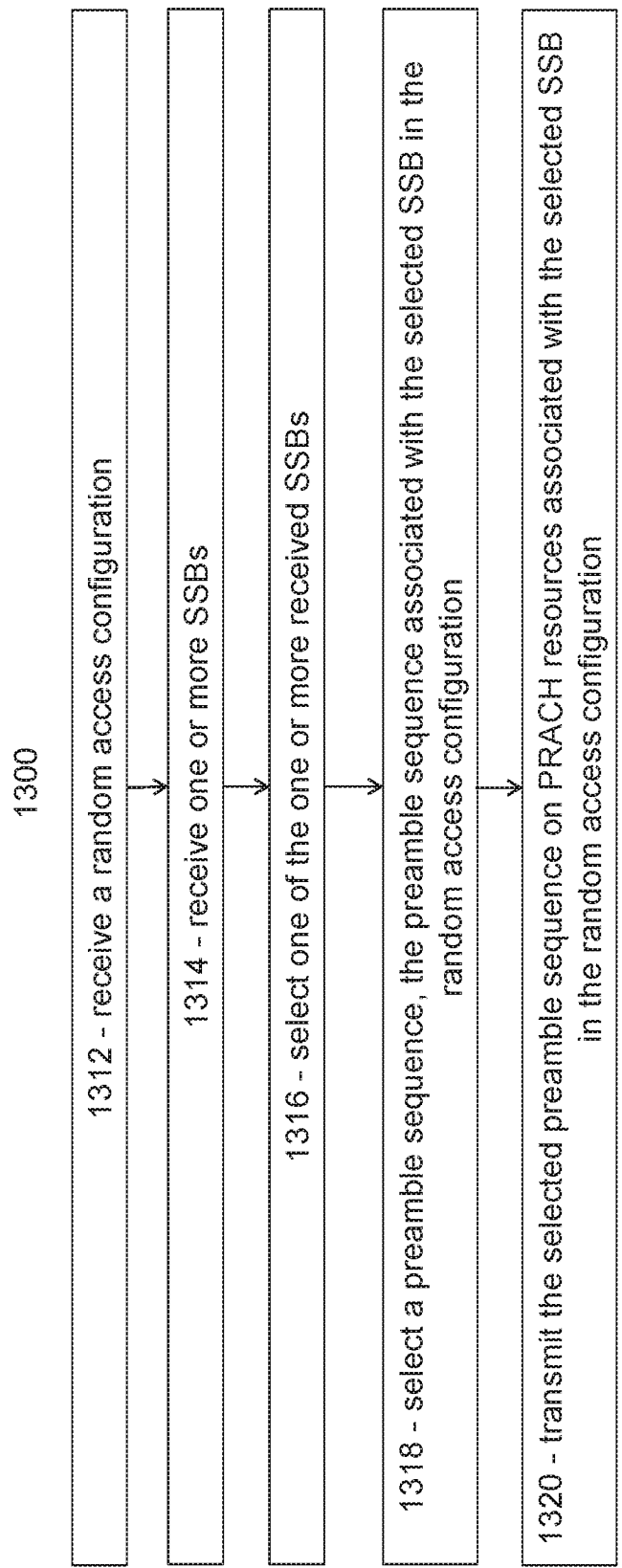
FIG. 13 is a flow diagram illustrating an example method in a wireless device, according to some embodiments.

FIG. 13 is a flow diagram illustrating an example method in a wireless device, according to some embodiments. In particular embodiments, one or more steps of FIG. 13 may be performed by wireless device 410 described with respect to FIG. 4.

The method begins at step 1312, where a wireless device receives a random access configuration. The random access configuration comprises one or more associations of a SSB, a preamble sequence, and PRACH resources. The PRACH resources comprise time domain resources and frequency domain resources. For example, wireless device 410 may receive a random access configuration (e.g., via PDCCH order, RRC message, etc.) from network node 460.

The random access configuration associates a particular SSB with a particular preamble sequence and particular PRACH resources. In particular embodiments, more than one SSB is associated with identical PRACH resources. The preamble sequence associated with each of the more than one SSBs identifies the SSB with respect to the PRACH resources. Some examples are described above with respect to FIG. 3.

In particular embodiments, receiving the random access configuration may comprise receiving one or more sets of preamble sequences, and the received PDCCH order or RRC message includes an index indicating a set of preamble sequences of the one or more sets of preamble sequences. Receiving the PDCCH order may comprise receiving a plurality of PDCCH orders, each PDCCH order received from a different direction and each PDCCH order associated with a respective preamble sequence or a respective PRACH resource.

In particular embodiments, receiving the random access configuration is performed in a primary cell and receiving the one or more SSBs is performed in a secondary cell. Some examples are described above with respect to FIG. 3.

At step 1314, the wireless device receives one or more SSBs. For example, wireless device 410 may receive several SSBs from network node 460. Each SSB may be received from a different direction.

At step 1316, the wireless device selects one of the one or more received SSBs. For example, wireless device 410 may receive a better SSB signal from one direction than from another direction. Wireless device 410 may select the SSB with the better signal. In some embodiments, the wireless device may use any suitable criteria to select an SSB.

At step 1318, the wireless device selects a preamble sequence that is associated with the selected SSB in the random access configuration. For example, wireless device 410 may compare the selected SSB with information in the received random access configuration to determine which preamble is associated with the selected SSB.

At step 1320, the wireless device transmits the selected preamble sequence on PRACH resources associated with the selected SSB in the random access configuration. For example, wireless device 410, using the same random access configuration associated with the selected SSB from the previous step, also determines which PRACH resources are associated with the selected SSB. Wireless device 410 perform random access by transmitting the selected preamble sequence on the determined PRACH resources.

Modifications, additions, or omissions may be made to method 1300. Additionally, one or more steps in method 1300 of FIG. 13 may be performed in parallel or in any suitable order. The steps of method 1300 may be repeated over time as necessary.

Figure 14:
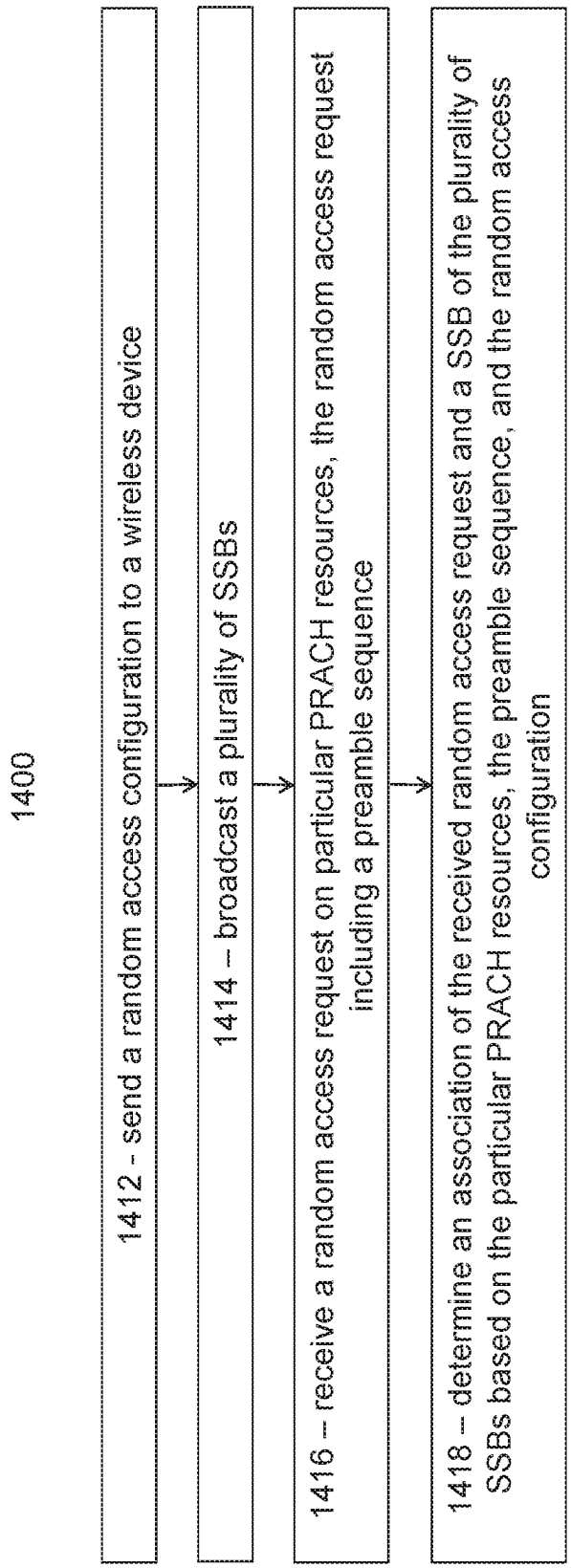
FIG. 14 is a flow diagram illustrating an example method in a network node, according to some embodiments.

FIG. 14 is a flow diagram illustrating an example method in a network node, according to some embodiments. In particular embodiments, one or more steps of FIG. 14 may be performed by network node 460 of described with respect to FIG. 4.

The method begins at step 1412, where a network node sends a random access configuration to a wireless device. For example, network node 460 may send a random access configuration to wireless device 410. The random access configuration and methods of sending the configuration are similar to those described with respect to FIGS. 3 and 13.

At step 1414, the network node broadcasts a plurality of SSBs. For example, network node 460 may broadcast a plurality of SSBs in different directions.

At step 1416, the network node receives a random access request on particular PRACH resources. The random access request includes a particular preamble sequence. For example, network node 460 may receive a random access request from wireless device 410.

At step 1418, the network node determines an association of the received random access request and a SSB of the plurality of SSBs based on the particular PRACH resources, the preamble sequence, and the random access configuration. For example, network node 460 knows the particular PRACH resources and particular preamble are associated with a particular SSB based on the random access configuration. Thus, network node 460 can determine which of the plurality of SSBs that wireless device 410 selected. Network node 460 also knows in which direction it transmitted the selected SSB, so network node 460 may use a similar beam direction for future communication with wireless device 410.

Modifications, additions, or omissions may be made to method 1400. Additionally, one or more steps in method 1400 of FIG. 14 may be performed in parallel or in any suitable order. The steps of method 1400 may be repeated over time as necessary.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR (corresponding to eNB in LTE)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method in a wireless device of performing random access, the method comprising:
receiving a random access configuration, the random access configuration comprising one or more associations of a synchronization signal block (SSB), a preamble sequence, and physical random access channel (PRACH) resources, wherein the preamble sequence is associated with at least two SSB groups, wherein the PRACH resources comprise time domain resources and frequency domain resources;
receiving one or more SSBs;
selecting one of the one or more received SSBs;
selecting a preamble sequence, the preamble sequence associated with the selected SSB in the random access configuration; and
transmitting the selected preamble sequence on PRACH resources associated with the selected SSB in the random access configuration.

2. The method of claim 1, wherein more than one SSB is associated with identical PRACH resources, and the preamble sequence associated with each of the more than one SSBs identifies the SSB with respect to the PRACH resources.

3. The method of claim 1, wherein receiving the random access configuration includes receiving a physical downlink control channel (PDCCH) order or radio resource control (RRC) message.

4. The method of claim 3, wherein receiving the random access configuration comprises receiving one or more sets of preamble sequences, and the received PDCCH order or RRC message includes an index indicating a set of preamble sequences of the one or more sets of preamble sequences.

5. The method of claim 3, wherein receiving the PDCCH order comprises receiving a plurality of PDCCH orders, each PDCCH order received from a different direction and each PDCCH order associated with a respective preamble sequence.

6. A wireless device capable of performing a random access procedure, the wireless device comprising processing circuitry operable to:
receive a random access configuration, the random access configuration comprising one or more associations of a synchronization signal block (SSB), a preamble sequence, and physical random access channel (PRACH) resources, wherein the preamble sequence is associated with at least two SSB groups, wherein the PRACH resources comprise time domain resources and frequency domain resources;
receive one or more SSBs;
select one of the one or more received SSBs;
select a preamble sequence, the preamble sequence associated with the selected SSB in the random access configuration; and
transmit the selected preamble sequence on PRACH resources associated with the selected SSB in the random access configuration.

7. The wireless device of claim 6, wherein more than one SSB is associated with identical PRACH resources, and the preamble sequence associated with each of the more than one SSBs identifies the SSB with respect to the PRACH resources.

8. The wireless device of claim 6, wherein the processing circuitry is operable to receive the random access configuration by receiving a physical downlink control channel (PDCCH) order or radio resource control (RRC) message.

9. The wireless device of claim 8, wherein the processing circuitry is operable to receive the random access configuration by receiving one or more sets of preamble sequences, and the received PDCCH order or RRC message includes an index indicating a set of preamble sequences of the one or more sets of preamble sequences.

10. The wireless device of claim 8, wherein the processing circuitry is operable to receive the PDCCH order by receiving a plurality of PDCCH orders, each PDCCH order received from a different direction and each PDCCH order associated with a respective preamble sequence.

11. The wireless device of claim 8, wherein the processing circuitry is operable to receive the PDCCH order by receiving a plurality of PDCCH orders, each PDCCH order received from a different direction and each PDCCH order associated with a respective PRACH resource.

12. The wireless device of claim 6, wherein the processing circuitry is operable to receive the random access configuration in a primary cell and the processing circuitry is operable to receive the one or more SSBs in a secondary cell.

13. A method in a network node of performing random access, the method comprising:
  sending a random access configuration to a wireless device, the random access configuration comprising one or more associations of a synchronization signal block (SSB), a preamble sequence, and physical random access channel (PRACH) resources, wherein the preamble sequence is associated with at least two SSB groups, wherein the PRACH resources comprise time domain resources and frequency domain resources;
  broadcasting a plurality of SSBs;
  receiving a random access request on particular PRACH resources, the random access request including a preamble sequence; and
  determining an association of the received random access request and a SSB of the plurality of SSBs based on the particular PRACH resources, the preamble sequence, and the random access configuration.

14. A network node capable of performing a random access procedure, the network node comprising processing circuitry operable to:
  send a random access configuration to a wireless device, the random access configuration comprising one or more associations of a synchronization signal block (SSB), a preamble sequence, and physical random access channel (PRACH) resources, wherein the preamble sequence is associated with at least two SSB groups, wherein the PRACH resources comprise time domain resources and frequency domain resources;
  broadcast a plurality of SSBs;
  receive a random access request on particular PRACH resources, the random access request including a preamble sequence; and
  determine an association of the received random access request and a SSB of the plurality of SSBs based on the particular PRACH resources, the preamble sequence, and the random access configuration.

15. The network node of claim 14, wherein more than one SSB is associated with identical PRACH resources, and the preamble sequence associated with each of the more than one SSBs identifies the SSB with respect to the PRACH resources.

16. The network node of claim 14, wherein the processing circuitry is operable to send the random access configuration by transmitting a physical downlink control channel (PDCCH) order or radio resource control (RRC) message to the wireless device.

17. The network node of claim 16, wherein the processing circuitry is operable to send the random access configuration by transmitting one or more sets of preamble sequences to the wireless device, and the transmitted PDCCH order or RRC message includes an index indicating a set of preamble sequences of the one or more sets of preamble sequences.

18. The network node of claim 16, wherein the processing circuitry is operable to transmit the PDCCH order by transmitting a plurality of PDCCH orders, each PDCCH order transmitted in a different direction and each PDCCH order associated with a respective preamble sequence.

19. The network node of claim 16, wherein the processing circuitry is operable to transmit the PDCCH order by transmitting a plurality of PDCCH orders, each PDCCH order transmitted in a different direction and each PDCCH order associated with a respective PRACH resource.

20. The network node of claim 14, wherein the processing circuitry is operable to send the random access configuration in a primary cell and wherein the processing circuitry is operable to broadcast the plurality of SSBs in a secondary cell.

\* \* \* \* \*